(12) United States Patent
Shamma (10) Patent No.: US 10,353,943 B2
(45) Date of Patent: Jul. 16, 2019

(54) COMPUTERIZED SYSTEM AND METHOD FOR AUTOMATICALLY ASSOCIATING METADATA WITH MEDIA OBJECTS

(71) Applicant: OATH INC., New York, NY (US)

(72) Inventor: David Ayman Shamma, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/272,739

(22) Filed: Sep. 22, 2016

(65) Prior Publication Data

US 2017/0011034 A1   Jan. 12, 2017

Related U.S. Application Data

(63) Continuation of application No. 11/949,638, filed on Dec. 3, 2007, now Pat. No. 9,465,892.

(51) Int. Cl.
| | |
|---|---|
| *G06F 16/00* | (2019.01) |
| *G06F 16/435* | (2019.01) |
| *G06F 16/438* | (2019.01) |
| *G06F 16/907* | (2019.01) |
| *G06F 16/9032* | (2019.01) |
| *G06F 16/9535* | (2019.01) |

(52) U.S. Cl.
CPC .......... *G06F 16/435* (2019.01); *G06F 16/438* (2019.01); *G06F 16/907* (2019.01); *G06F 16/9032* (2019.01); *G06F 16/9535* (2019.01)

(58) Field of Classification Search
CPC ............................................... G06F 17/30265
See application file for complete search history.

(56) References Cited

U.S. PATENT DOCUMENTS

| | | | |
|---|---|---|---|
| 5,319,374 A | 6/1994 | Desai et al. | |
| 6,085,249 A | 7/2000 | Wang et al. | |
| 6,377,995 B2 | 4/2002 | Agraharam et al. | |
| 6,564,263 B1 | 5/2003 | Bergman et al. | |
| 6,741,684 B2 | 5/2004 | Kaars | |
| 7,076,503 B2 | 7/2006 | Platt et al. | |
| 7,117,453 B2 | 10/2006 | Drucker et al. | |

(Continued)

OTHER PUBLICATIONS

International Search Report and Written Opinion to corresponding International Application No. PCT/US2008/084418, dated Jul. 17, 2009.

(Continued)

*Primary Examiner* — Tarek Chbouki
(74) *Attorney, Agent, or Firm* — James J. DeCarlo; Greenberg Traurig, LLP (57) ABSTRACT

In accordance with embodiments of the present invention, a method for associating metadata with a media object is provided. The method provides the ability to tag, or bookmark, a point in time for future use. The method includes receiving the metadata, an associated time condition, and an associated user identification. The method further includes storing at least the time condition. The at least stored time condition is used, at least in part, for associating the metadata with the media object. The media object is then provided to the user. In some embodiments the media object is not available for association with the metadata at the time the metadata is received. In other embodiments, the media object is provided by an external application.

20 Claims, 5 Drawing Sheets

(56) References Cited

U.S. PATENT DOCUMENTS

| | | | |
|---|---|---|---|
| 7,383,497 B2 | 6/2008 | Glenner et al. | |
| 7,415,662 B2 | 8/2008 | Rothmuller et al. | |
| 7,509,321 B2 | 3/2009 | Wong et al. | |
| 7,657,845 B2 | 2/2010 | Drucker et al. | |
| 7,679,310 B2 | 3/2010 | Schulz et al. | |
| 7,724,281 B2 | 5/2010 | Vale et al. | |
| 7,725,812 B1 | 5/2010 | Balkus et al. | |
| 7,881,715 B2 | 2/2011 | Kirani et al. | |
| 8,037,021 B2* | 10/2011 | Adler | G06Q 10/109 707/610 |
| 2001/0047298 A1 | 11/2001 | Moore et al. | |
| 2002/0055955 A1* | 5/2002 | Lloyd-Jones | G06F 17/30265 715/233 |
| 2002/0059342 A1* | 5/2002 | Gupta | G06F 17/241 715/233 |
| 2002/0099552 A1 | 7/2002 | Rubin et al. | |
| 2003/0067554 A1 | 4/2003 | Klarfeld et al. | |
| 2003/0159048 A1 | 8/2003 | Matsumoto et al. | |
| 2003/0233349 A1 | 12/2003 | Stern et al. | |
| 2004/0003352 A1 | 1/2004 | Bargeron et al. | |
| 2004/0267715 A1 | 12/2004 | Poison et al. | |
| 2004/0267738 A1 | 12/2004 | Shin | |
| 2005/0114357 A1* | 5/2005 | Chengalvarayan | G06F 17/30038 |
| 2006/0004914 A1 | 1/2006 | Kelly et al. | |
| 2006/0074883 A1 | 4/2006 | Teevan et al. | |
| 2007/0008321 A1* | 1/2007 | Gallagher | G06F 17/30265 345/473 |
| 2007/0143376 A1 | 6/2007 | McIntosh | |
| 2007/0192818 A1 | 8/2007 | Bourges-Sevenier et al. | |
| 2008/0126366 A1* | 5/2008 | Malik | G06F 17/30038 |
| 2008/0133584 A1* | 6/2008 | Nishino | G06F 17/30861 |
| 2008/0172363 A1 | 7/2008 | Wang et al. | |
| 2008/0177780 A1 | 7/2008 | Tan | |
| 2008/0313570 A1 | 12/2008 | Shamma et al. | |
| 2009/0004914 A1 | 1/2009 | Sutter | |
| 2009/0023433 A1 | 1/2009 | Walley et al. | |
| 2009/0119333 A1 | 5/2009 | Sundstrom et al. | |

OTHER PUBLICATIONS

Marc Davis et al., From context to content: leveraging contecxt to infer media metata, Oct. 16 2004, ACM Association for computing Machinery, pp. 188-195.

* cited by examiner

COMPUTERIZED SYSTEM AND METHOD FOR AUTOMATICALLY ASSOCIATING METADATA WITH MEDIA OBJECTS

CROSS REFERENCE TO RELATED APPLICATIONS

This application is a continuation of, and claims priority from co-pending U.S. patent application Ser. No. 11/949,638, filed on Dec. 3, 2007, entitled "Associating Metadata With Media Objects Using Time," which is incorporated herein by reference.

BACKGROUND OF THE INVENTION

Adding metadata, such as tags, to digital media is an effective mechanism for describing, searching, and sorting existing digital media objects. Media may be images, audio, or video files, for example. Although adding metadata, such as tags, to a media objects is a useful method for facilitating categorizing files, traditionally, the media object must always be already available in order to associate a tag with it.

Because, generally, the media object would have to be available before metadata could be added, the user would have to spend time to access the appropriate media object, and then add a tag. In other words, a user needs to encounter the media object before having the ability to add a tag. However, there is no ability to tag media which will be available in the future.

Therefore, a method and system for associating metadata, by indicating a time, with a media object that is not yet available, is desired.

BRIEF SUMMARY OF THE INVENTION

In accordance with embodiments of the present invention, a method for associating metadata with a media object is provided. The method provides the ability to tag or bookmark a point in time for future use. The method includes receiving the metadata, an associated time condition, and an associated user identification. The method further includes storing at least the time condition. The at least stored time condition is used, at least in part, for associating the metadata with the media object. The media object is then provided to the user.

In accordance with some embodiments of the present invention, a computer-readable medium comprising instructions for a processor, for associating metadata with a media object, is provided. The instructions include receiving the metadata, an associated time condition, and an associated user identification. The instructions further include storing at least the time condition. The at least stored time condition is used, at least in part, for associating the metadata with the media object. The media object is then provided to the user.

Furthermore, in accordance with some embodiments of the present invention, a system for associating metadata with a media object is provided. The system includes logic for receiving the metadata, an associated time condition, and an associated user identification. The system further includes a database for storing at least the time condition. The system also includes logic for associating the metadata with the media object based at least in part upon the time condition, and logic for providing to the user the media object.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Embodiments of the invention enable users to associate metadata with media objects which the user is unaware of or does not have access to at the time, in form of tags and annotations, for example. The metadata is associated with the media object based in part on a time condition.

In some embodiments, a user may be able to determine activities and events that may be of interest to the user in the future. For example, metadata may be associated to event data from an application that provides upcoming local events. An example of an application that may be used is upcoming.yahoo.com. The user's associated metadata may also indicate the user's level of interest or engagement in certain types of activities and events.

"Metadata" may refer to multiple metadata or just one metadatum, such as a tag or annotation. A tag is a keyword or term associated with a piece of information, such as a media object. The metadata, or tag, is describing the item and enabling keyword-based classification and search of information. Tags are usually chosen by an author or by a consumer, viewers, or a community. Media objects may be, but are not limited to, a picture, a geographic map, a blog entry, a video clip etc.

Figure 1:
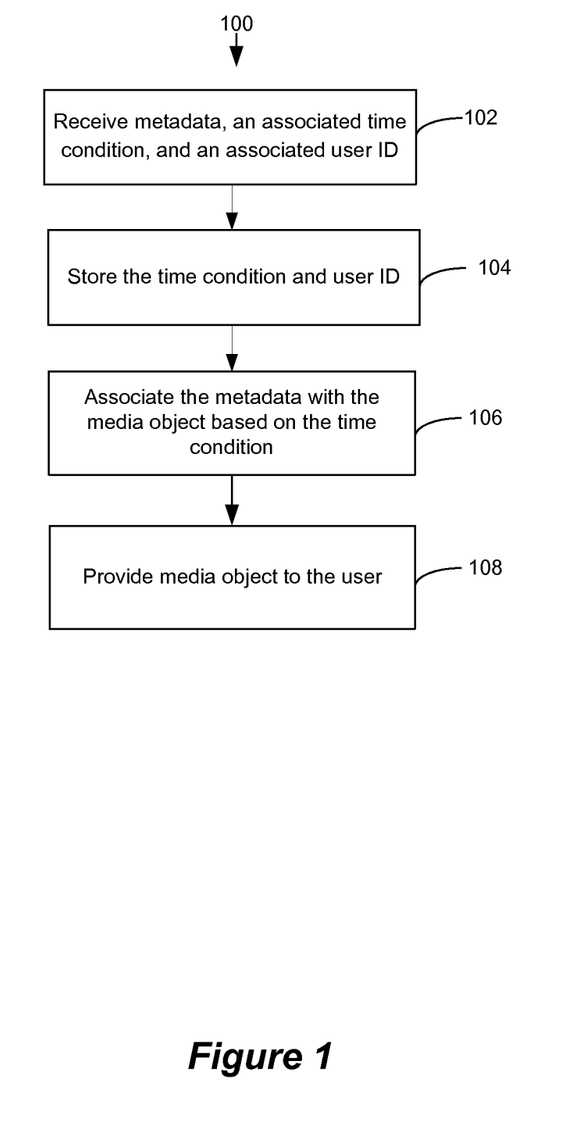
FIG. 1 illustrates a flowchart of a method for associating metadata with a media object according to embodiments of the invention.

As illustrated in FIG. 1, embodiments of the invention provide for associating metadata with a media object. After receiving the metadata, an associated time condition, and an associated user identification in 102, at least the time condition and user ID is stored in a database 104. In response to a request for the metadata, the metadata is associated with the media object in 106 and provided to the user 108. More particularly, the media object may be uploaded to the client at the client. The user may view a video file with the tags associated, for example.

Figure 2:
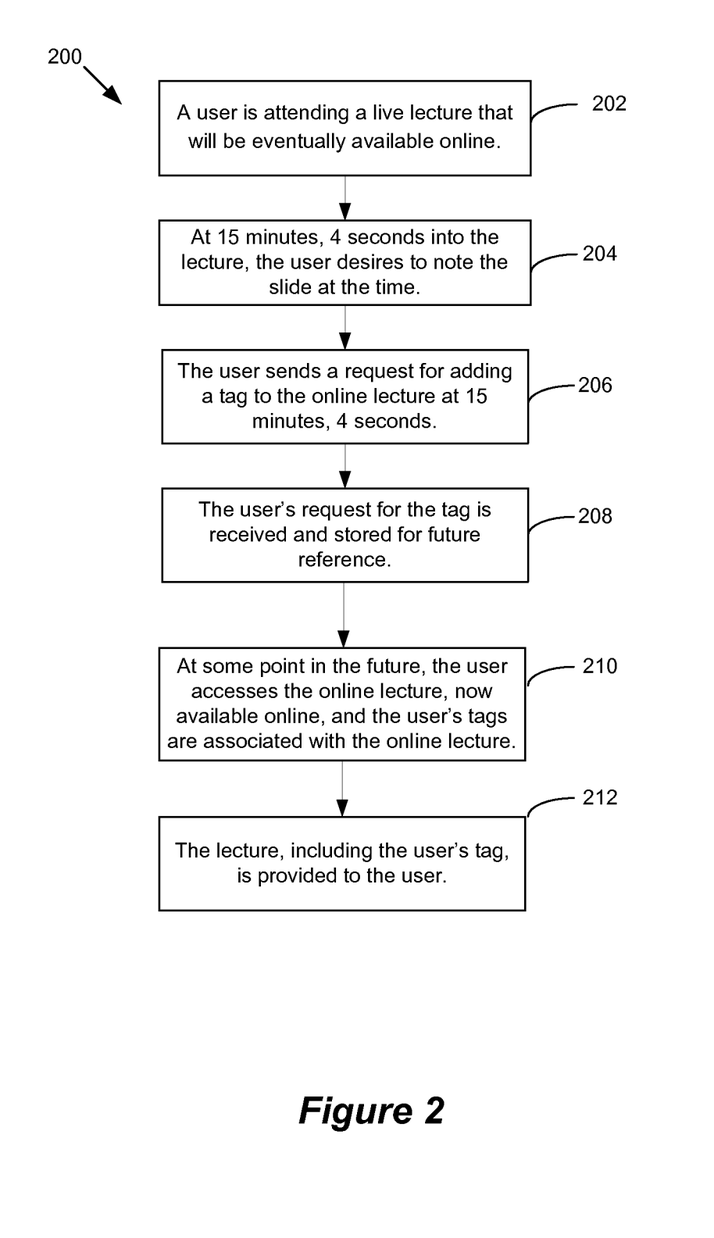
FIG. 2 illustrates a method of a user adding metadata to a lecture according to embodiments of the invention.

FIG. 2 illustrates an example of a method of adding metadata to a media object according to embodiments of the invention. In 202, a student is attending a live lecture. The lecture is being recorded and it is promised it will be available online in the near future. While the student is taking notes, the lecturer shows an interesting slide at 15 minutes and 4 seconds into the lecture in 204. The student runs an application on his cell phone which stores a tag to a database at that time instant in 206. Weeks later, the student gets the URL to the video of the lecture posted online. When he accesses the webpage, a dynamic request checks the timestamp and duration on the video of the lecture and checks the database to see if the student left a tag during this time 210. The user may also initiate the request to the database for stored tags that belong to them. The request matches a tag in the database and displays a list of bookmarks, or other indicators, on the timeline of the video, in 212, showing the student the point of interest (at 15 m 4 s).

The user may also be prompted to choose if they wish to import the tag into the current media object. If the user chooses to import the tag, the tag is added as metadata to the current media object, such as the online lecture video, and are removed from the database.

However, the user may also choose to apply the tag. In this case, the tag is also added as metadata to the media object, but kept stored in the database. The tag may be applied to other media objects in the future.

If the prompt is ignored, the tag may remain stored in the database.

Figure 3:
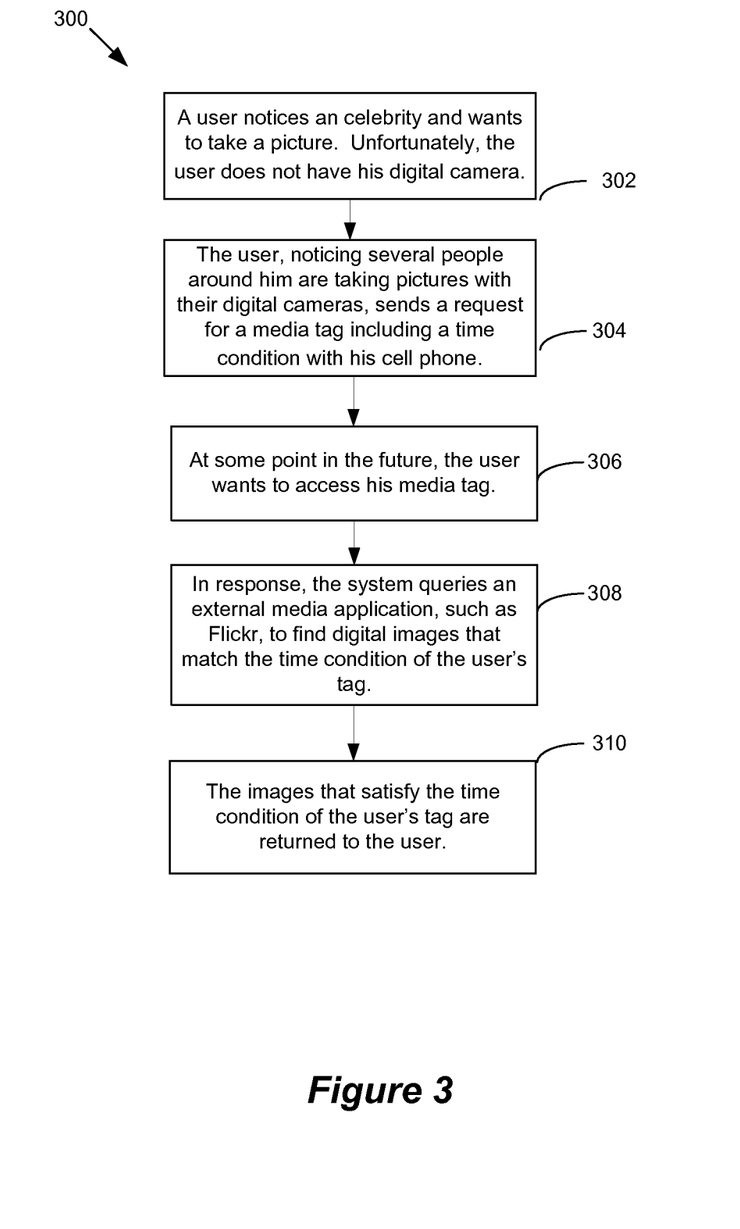
FIG. 3 illustrates a method of a user creating metadata for an image that is not yet available according to embodiments of the invention.

FIG. 3 illustrates another example of a method of adding metadata to a media object according to embodiments of the invention. As shown in 302, a user notices a celebrity while he is out, but is without his digital camera. Fortunately, the user notices several people around him taking pictures of this celebrity. He sends a request for adding metadata, or a tag, for images at this instant in time via his cell phone 304. The request contains the user's ID and time information. At some point in the future, the user wants to find the media associated with his metadata by the time information. He accesses his metadata by his user ID and a query is sent to an external media application to return images that satisfy the time condition of his added tag 308. The query may alternatively be dynamically generated. Dynamic generation of the query for associating a media object to metadata may be in response to a user logging into their account, for example.

The query will search for images that were created at the time specified by the time condition and were uploaded to the external media application. The external media application may be photo sharing sites, such as Flickr, for example. The images that are found to satisfy the time condition defined in the added metadata by the user are returned to the user 310. The user hopes to find a digital image created at the same instant he made the request to a system for adding metadata to a media object.

As described above, the user may be prompted with the options of importing or applying the tag.

Figure 4:
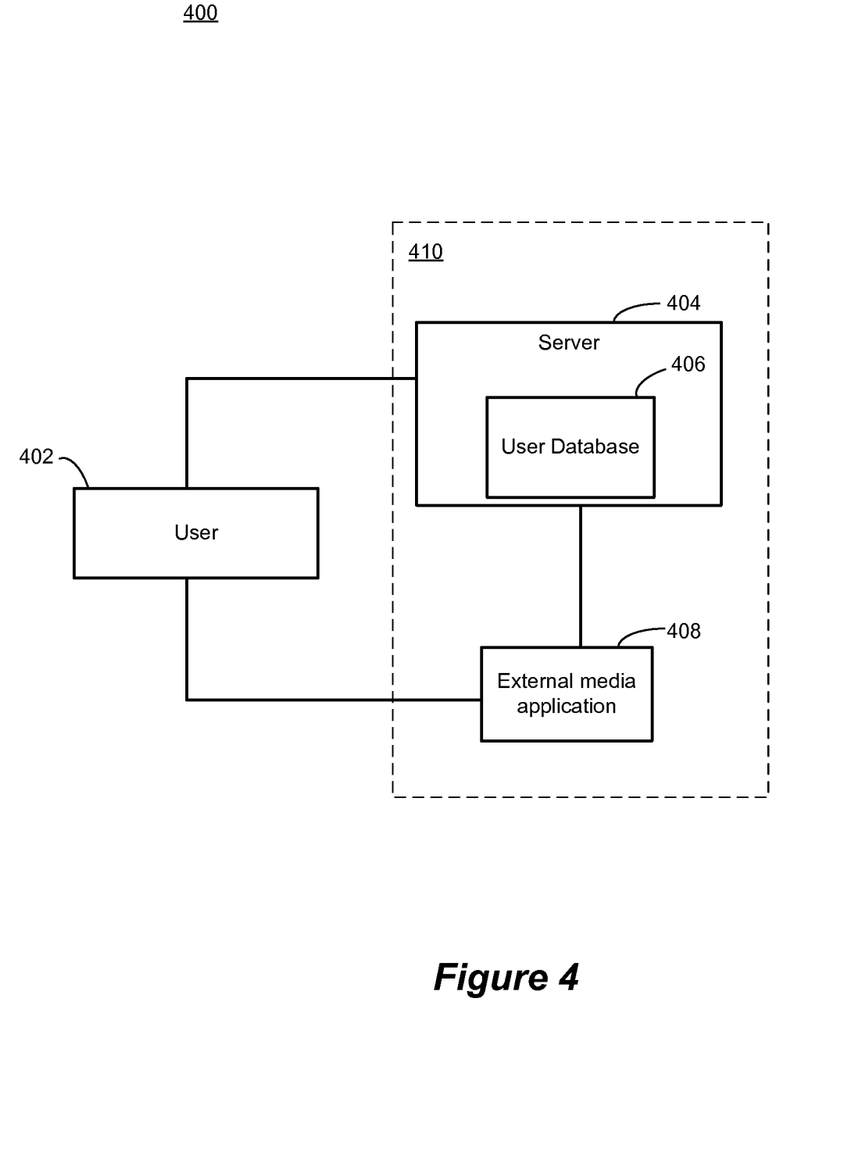
FIG. 4 illustrates a block diagram of a client/server system according to embodiments of the invention.

FIG. 4 illustrates a block diagram of the system 400 according to embodiments of the invention. A user 402 makes a request to a server 404. The request may be sent from the user 402 via a client application by making a user authenticated request to post and store the time data of the current time in a database 406. The database 406 may store the time condition and the user ID. The client application may be, for example, a mobile or cell phone application. The client application may be implemented on a personal computer system as well. The request may also include additional metadata for storing in the database that is associated with the time data additional metadata. The additional metadata may include location, additional tags, comments, and annotations, for example.

The server 404 may request the metadata from the database 406. This request may be an API (Application Programming Interface). The API request can return all the metadata, or tags, within a specified time range.

The tags are associated to a media, which may be from an external media application 408. The external media application may be Flickr, YouTube, emails, calendar entries, etc, for example.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
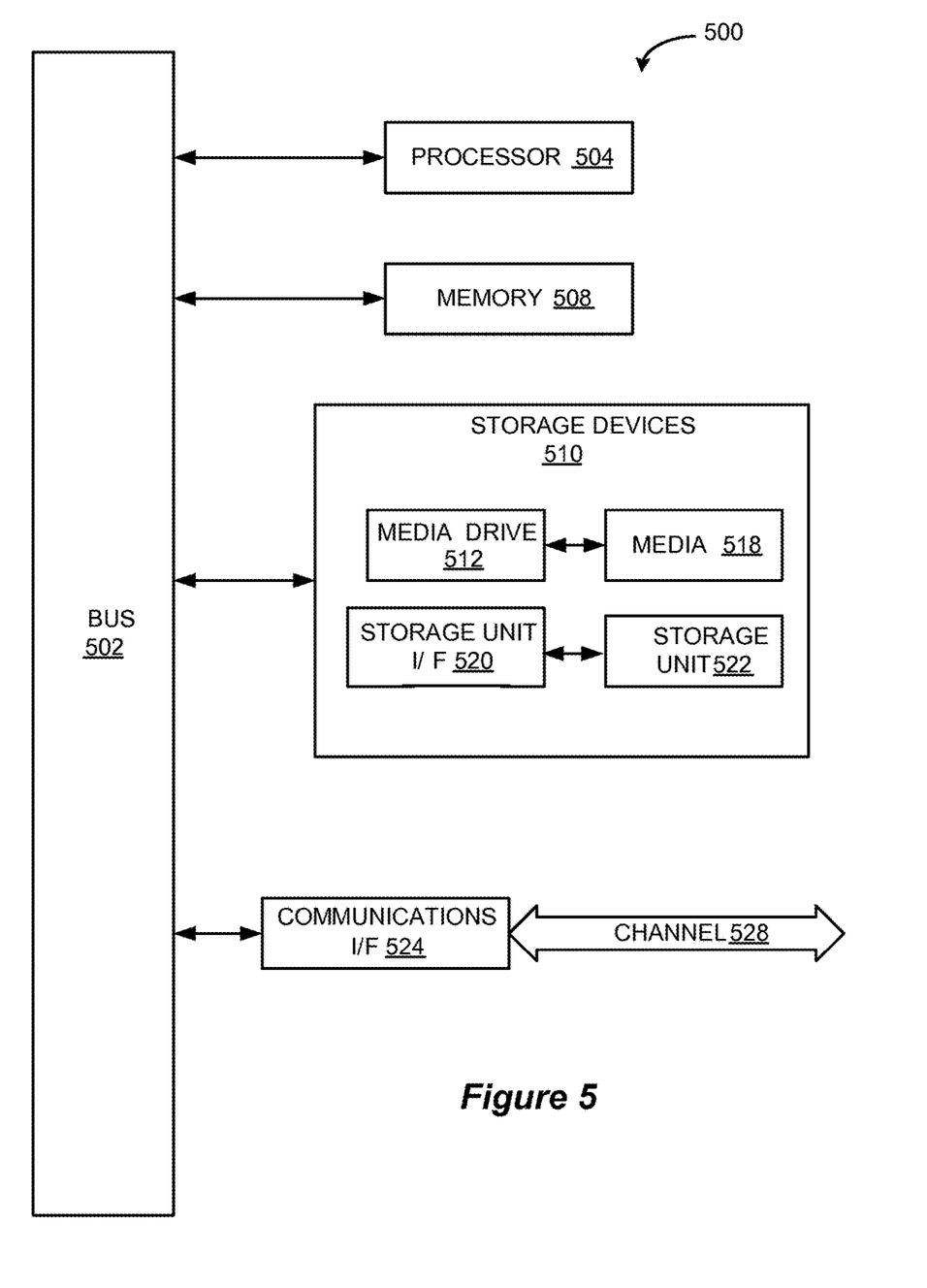
FIG. 5 illustrates a block diagram of a computing system according to embodiments of the invention.

FIG. 5 illustrates an exemplary computing system 500 that may be employed to implement processing functionality for various aspects of the invention (e.g., as a server device, client device, database, presence platform, combinations thereof, and so on). Those skilled in the relevant art will also recognize how to implement the invention using other computer systems or architectures. Computing system 500 may represent, for example, a desktop, mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 608, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, storage unit 522, or signal(s) on channel 528. These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:
1. A method comprising:
 receiving, by a media application executing on a media server, a request from a user for digital content, said request comprising metadata indicating event information associated with the digital content;
 identifying, via the media application, a set of media objects based on said received request, each identified media object comprising said digital content;
 automatically analyzing, via the media application upon identifying the set of media objects, event data associated with a real-world event from which the media objects were generated, said event data comprising annotations of the media objects providing indications of types of data included in said media objects;
 modifying, via the media application, the media objects in the set of media objects based on said analysis of the event data, said modification comprising annotating each media object in said set of media objects with said annotations included in said event data;
 storing, via the media application, said modified media objects in a database associated with the media application;
 dynamically generating via the media application, a query comprising at least said metadata included in said request;
 performing a search of said database, via the media application, based on said generated query for a media object within said modified media object set comprising said requested digital content in association with said event information, said search identifying a media object from said set that is annotated with an annotation that corresponds to said event information; and communicating, via the media application over a network, said identified media object to said user.

2. The method of claim 1, wherein said event data further comprises a time within each said media object, said time corresponding to when within each media object each type of data is in each said media object.

3. The method of claim 1, wherein said event data is associated with an activity of the user, wherein said event data further comprises an identifier associated with the user.

4. The method of claim 3, wherein said query further comprises an instruction for searching for content stored in said database and associated with said user.

5. The method of claim 1, further comprising:
receiving, from at least one user including the user over a network, the set of media objects; and
storing, in said database associated with the media application, said media objects.

6. The method of claim 1, further comprising:
receiving, from the media application, said media objects; and
storing, in said database associated with media application, said media objects.

7. The method of claim 1, wherein said event information comprises a real-world time value, wherein said identified media object has said type of data occurring within said media object at said time value.

8. The method of claim 7, wherein said time value is a time range, wherein said identified media object has said type of data occurring within said media object during said time range.

9. The method of claim 7, wherein said dynamically generated query is automatically created by said media application.

10. A non-transitory computer-readable storage medium tangibly encoded with computer-executable instructions, that when executed by a media server, perform a method comprising:
receiving, a media application executing on the media server, a request from a user for digital content, said request comprising metadata indicating event information associated with the digital content;
identifying, via the media application, a set of media objects based on said received request, each identified media object comprising said digital content;
automatically analyzing, via the media application upon identifying the set of media objects, event data associated with a real-world event from which the media objects were generated, said event data comprising annotations of the media objects providing indications of types of data included in said media objects;
modifying, via the media application, the media objects in the set of media objects based on said analysis of the event data, said modification comprising annotating each media object in said set of media objects with said annotations included in said event data;
storing, via the media application, said modified media objects in a database associated with the media application;
dynamically generating via the media application, a query comprising at least said metadata included in said request;
performing a search of said database, via the media application, based on said generated query for a media object within said modified media object set comprising said requested digital content in association with said event information, said search identifying a media object from said set that is annotated with an annotation that corresponds to said event information; and communicating, via the media application over a network, said identified media object to said user.

11. The non-transitory computer-readable storage medium of claim 10, wherein said event data further comprises a time within each said media object, said time corresponding to when within each media object each type of data is in each said media object.

12. The non-transitory computer-readable storage medium of claim 10, wherein said event data is associated with an activity of the user, wherein said event data further comprises an identifier associated with the user.

13. The non-transitory computer-readable storage medium of claim 12, wherein said query further comprises an instruction for searching for content stored in said database and associated with said user.

14. The non-transitory computer-readable storage medium of claim 10, further comprising:
receiving, from at least one user including the user over a network, the set of media objects; and
storing, in said database associated with the media application, said media objects.

15. The non-transitory computer-readable storage medium of claim 10, further comprising:
receiving, from the media application, said media objects; and
storing, in said database associated with media application, said media objects.

16. The non-transitory computer-readable storage medium of claim 10, wherein said event information comprises a real-world time value, wherein said identified media object has said type of data occurring within said media object at said time value.

17. The non-transitory computer-readable storage medium of claim 16, wherein said time value is a time range, wherein said identified media object has said type of data occurring within said media object during said time range.

18. The non-transitory computer-readable storage medium of claim 16, wherein said dynamically generated query is automatically created by said media application.

19. A media server, comprising:
a processor; and
a non-transitory computer-readable storage medium for tangibly storing thereon program logic for execution by the processor, the program logic comprising:
logic executed by the processor for receiving, by a media application executing on the media server, a request from a user for digital content, said request comprising metadata indicating event information associated with the digital content;
logic executed by the processor for identifying, via the media application, a set of media objects based on said received request, each identified media object comprising said digital content;
logic executed by the processor for automatically analyzing, via the media application upon identifying the set of media objects, event data associated with a real-world event from which the media objects were generated, said event data comprising annotations of the media objects providing indications of types of data included in said media objects;
logic executed by the processor for modifying, via the media application, the media objects in the set of media objects based on said analysis of the event data, said modification comprising annotating each media object in said set of media objects with said annotations included in said event data;

logic executed by the processor for storing, via the media application, said modified media objects in a database associated with the media application;

logic executed by the processor for dynamically generating via the media application, a query comprising at least said metadata included in said request;

logic executed by the processor for performing a search of said database, via the media application, based on said generated query for a media object within said modified media object set comprising said requested digital content in association with said event information, said search identifying a media object from said set that is annotated with an annotation that corresponds to said event information; and logic executed by the processor for communicating, via the media application over a network, said identified media object to said user.

20. The media server of claim 19, wherein said dynamically generated query is automatically created by said media application.

\* \* \* \* \*